(12) United States Patent
Kim et al.

(10) Patent No.: US 10,897,042 B2
(45) Date of Patent: Jan. 19, 2021

(54) COMPOSITE POSITIVE ELECTRODE ACTIVE MATERIAL FOR LITHIUM SECONDARY BATTERY AND LITHIUM SECONDARY BATTERY COMPRISING ELECTRODE INCLUDING THE COMPOSITE POSITIVE ELECTRODE ACTIVE MATERIAL

(71) Applicant: SAMSUNG SDI CO., LTD., Yongin-si (KR)

(72) Inventors: Jihyun Kim, Yongin-si (KR); Hyunjoo Je, Yongin-si (KR); Changwook Kim, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 694 days.

(21) Appl. No.: 14/690,276

(22) Filed: Apr. 17, 2015

(65) Prior Publication Data

US 2016/0028078 A1    Jan. 28, 2016

(30) Foreign Application Priority Data

Jul. 24, 2014   (KR) ........................ 10-2014-0094153

(51) Int. Cl.
*H01M 4/36*     (2006.01)
*H01M 4/525*    (2010.01)
(Continued)

(52) U.S. Cl.
CPC ........... *H01M 4/366* (2013.01); *H01M 4/131* (2013.01); *H01M 4/136* (2013.01); *H01M 4/505* (2013.01);
(Continued)

(58) Field of Classification Search
None
See application file for complete search history.

(56) References Cited

U.S. PATENT DOCUMENTS

| 6,277,523 B1 * | 8/2001 | Giron ................... G02F 1/1525 |
| | | 429/304 |
| 2010/0290044 A1 * | 11/2010 | Lee ....................... H01M 2/166 |
| | | 356/326 |
| 2012/0328936 A1 | 12/2012 | Wessells et al. |

FOREIGN PATENT DOCUMENTS

| CN | 103872373 A * | 6/2014 | ........ H01M 10/0525 |
| CN | 103872373 A | 6/2014 | |

(Continued)

OTHER PUBLICATIONS

Machine translation of CN103872373A (Year: 2014).*

(Continued)

*Primary Examiner* — Tamir Ayad
(74) *Attorney, Agent, or Firm* — Lewis Roca Rothgerber Christie LLP

(57) ABSTRACT

A composite positive electrode active material for a lithium secondary battery including a compound represented by Formula 1 below and a compound represented by Formula 2 below, and a lithium secondary battery employing a positive electrode that includes the composite positive electrode active material:

$$Li_aNi_xCo_yMn_zM_{1-x-y-z}O_2 \qquad \text{Formula 1}$$

wherein, in Formula 1, ranges of M, a, x, and y are as defined in the detailed description above, and $$M^1_z[M^2(CN)_6]_x \cdot nH_2O \qquad \text{Formula 2}$$

wherein, in Formula 2, $M^1$, $M^2$, z, x, and n are as defined in the detailed description above.

16 Claims, 5 Drawing Sheets

(51) Int. Cl.
*H01M 4/505* (2010.01)
*H01M 10/052* (2010.01)
*H01M 4/131* (2010.01)
*H01M 4/02* (2006.01)
*H01M 4/58* (2010.01)
*H01M 4/136* (2010.01)

(52) U.S. Cl.
CPC ............ *H01M 4/525* (2013.01); *H01M 4/58* (2013.01); *H01M 10/052* (2013.01); *H01M 2004/021* (2013.01); *H01M 2004/028* (2013.01); *Y02T 10/70* (2013.01)

(56) References Cited

FOREIGN PATENT DOCUMENTS

| | | | |
|---|---|---|---|
| JP | 2011-246303 | A | 12/2011 |
| JP | 2012-046399 | A | 3/2012 |
| JP | 2012-094483 | A | 5/2012 |

OTHER PUBLICATIONS

English machine translation of Japanese Publication No. JP 2011-246303, dated Dec. 8, 2011, 10 pages.
English machine translation of Japanese Publication No, JP 2012-046399, dated Mar. 8, 2012, 14 pages.
English machine translation of Japanese Publication No. JP 2012-094483, dated May 17, 2012, 47 pages.
Imanishi, N. et al., "Lithium intercalation behavior into iron cyanide complex as positive electrode of lithium secondary battery", Journal of Power Sources, 1999, pp. 215-219, vol. 79.
Korean Office Action dated Jul. 1, 2020, for corresponding Korean Patent Application No. 10-2014-0094153 (8 pages).

* cited by examiner

COMPOSITE POSITIVE ELECTRODE ACTIVE MATERIAL FOR LITHIUM SECONDARY BATTERY AND LITHIUM SECONDARY BATTERY COMPRISING ELECTRODE INCLUDING THE COMPOSITE POSITIVE ELECTRODE ACTIVE MATERIAL

CROSS-REFERENCE TO RELATED APPLICATION

This application claims priority to and the benefit of Korean Patent Application No. 10-2014-0094153, filed on Jul. 24, 2014, in the Korean Intellectual Property Office, the disclosure of which is incorporated herein in its entirety by reference.

BACKGROUND

1. Field

One or more embodiments of the present invention relate to a composite positive electrode active material for a lithium secondary battery, and a lithium secondary battery employing a positive electrode that includes the composite positive electrode active material.

2. Description of the Related Art

Lithium secondary batteries that are stable at high voltages and have high energy densities are used (utilized) in a variety of applications. For example, regarding their application to electric vehicles (e.g., HEV and PHEV), there is a need for lithium secondary batteries that are operable at high temperatures, able to charge or discharge a large amount of electricity, and have long-term usability, and that is, lithium secondary batteries that have an excellent discharge capacity and a long lifetime are demanded.

Lithium secondary batteries use a positive electrode active material, such as lithium cobalt oxide or lithium manganese oxide. However, these positive electrode active materials may not have satisfactory charge-discharge capacity and cycle characteristics.

SUMMARY

One or more aspects of one or more embodiments of the present invention are directed toward a composite positive electrode active material for a lithium secondary battery having an extended cycle life.

One or more aspects of one or more embodiments of the present invention are directed toward a lithium secondary battery having an improved cell performance by employing a positive electrode that includes the composite positive electrode active material.

Additional aspects will be set forth in part in the description which follows and, in part, will be apparent from the description, or may be learned by practice of the presented embodiments.

According to one or more embodiments of the present invention, a composite positive electrode active material for a lithium secondary battery includes a compound represented by Formula 1 below, and a compound represented by Formula 2 below.

   Formula 1 wherein, in Formula 1, M is selected from the group consisting of boron (B), magnesium (Mg), aluminum (Al), chrome (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W), and a, x, y, and z satisfy the equations of $1.0 \le a \le 1.2$, $0.0 \le x < 1.0$, $0.1 < y \le 1.0$, $0.0 \le z \le 1.0$, and $0.0 \le 1-x-y-z \le 0.3$.

   Formula 2 wherein, in Formula 2, $M^1$ and $M^2$ are each independently selected from the group consisting of vanadium (V), manganese (Mn), cobalt (Co), nickel (Ni), and copper (Cu), z is in the range of about 2 to about 4, x is in the range of about 1 to about 5, and n is 0 or in the range of about 1 to about 10.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
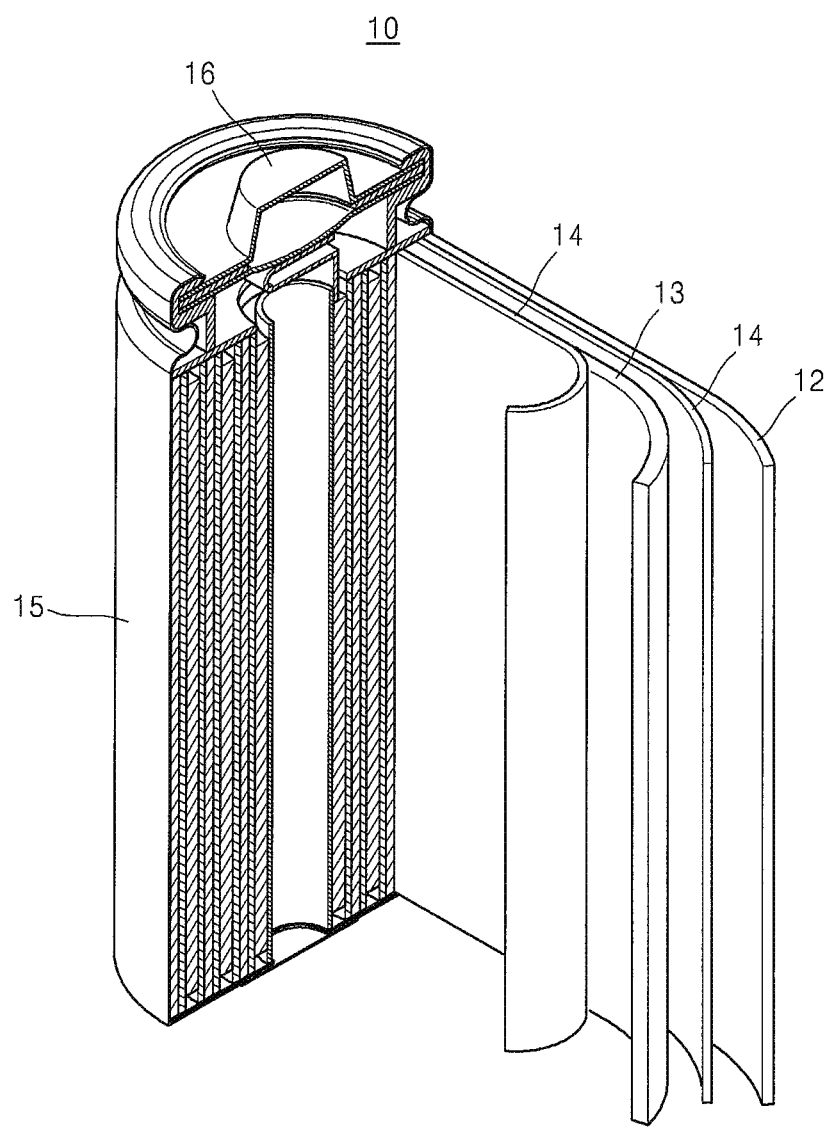
FIG. 1 is a schematic view of a lithium secondary battery according to an embodiment of the present invention.

Reference will now be made in more detail to embodiments of a composite positive electrode active material for a lithium secondary battery and a lithium secondary battery employing a positive electrode that includes the composite positive electrode active material, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

According to an embodiment, a composite positive electrode active material for a lithium secondary battery may include a compound represented by Formula 1 below and a compound represented by Formula 2 below.

$$Li_aNi_xCo_yMn_zM_{1-x-y-z}O_2 \quad \text{Formula 1}$$

wherein, in Formula 1, M may be selected from the group consisting of boron (B), magnesium (Mg), aluminum (Al), chrome (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten, a, x, y, and z may satisfy the equations of $1.0 \le a \le 1.2$, $0.0 \le x < 1.0$, $0.1 < y \le 1.0$, $0.0 \le z1.0$, and $0.0 \le 1-x-y-z \le 0.3$, and z is, for example, in the range of 0 to about 0.7.

$$M^1_z[M^2(CN)_6]_x \cdot nH_2O \quad \text{Formula 2}$$

wherein, in Formula 2, $M^1$ and $M^2$ may be at least one selected from the group consisting of vanadium (V), manganese (Mn), copper (Co), nickel (Ni), and copper (Cu), z may be in the range of about 2 to about 4, x may be in the range of about 1 to about 5, and n may be 0 or in the range of about 1 to about 10. The composite positive electrode active material according to an embodiment is the compound of Formula 1 coated on the surface thereof with the compound of Formula 2.

The composite positive electrode active material according to another embodiment may be a mixture of the compound of Formula 1 and the compound of Formula 2.

The compound of Formula 1 may be a compound represented by Formula 3 below, a compound represented by Formula 4, or a compound represented by Formula 5.

$$LiNi_xCo_yMn_zO_2 \quad \text{Formula 3}$$

wherein, in Formula 3, x, y, and z may be each independently in the range of 0 to about 1, and may satisfy the equation of $x+y+z=1$.

$$Li_aCo_yO_2 \quad \text{Formula 4}$$

wherein, in Formula 4, a may be in the range of about 1.0 to about 1.2, and y may be in the range of about 0.1 to about 1.0.

$$LiNi_xCo_yM_{1-x-y}O_2 \quad \text{Formula 5}$$

wherein, in Formula 5, x may be in the range of 0 to about 0.9, y may be from about 0.1 to about 0.2, and M may be selected from the group consisting of B, Mg, Al, Cr, V, Ti, Fe, Zr, Zn, Si, Y, Nb, Ga, Sn, Mo, and W.

In Formula 3, x, y, and z may satisfy the equations of $0 < y < 0.5$, $0.2 < z < 0.5$, and $x+y+z=1$.

The compound of Formula 1 may be $LiCoO_2$, $LiNi_{0.4}Co_{0.2}Mn_{0.4}O_2$, $LiNi_{0.5}Co_{0.2}Mn_{0.3}O_2$, $LiNi_{1/3}Co_{1/3}Mn_{1/3}O_2$, or $LiNi_{0.8}Co_{0.15}Al_{0.05}$.

The compound of Formula 2 may be $Fe_4[Fe(CN)_6]_3 \cdot nH_2O$ (wherein n is 0 or in the range of about 1 to about 3), and for example, $Fe_4[Fe(CN)_6]_3 \cdot 3H_2O$ or $Fe_4[Fe(CN)_6]_3$.

The amount of the compound of Formula 2 may be in the range of about 0.01 mol % to about 5 mol %, for example, about 0.5 mol % to about 1.0 mol %, based on the total amounts of the composite positive electrode active material (the total amounts of the compound of Formula 1 and the compound of Formula 2). When the amount of the compound of Formula 2 is within this range, the deterioration of the composite positive electrode active material may be effectively prevented upon operation at high voltages, and accordingly, the lithium secondary battery may have an excellent cycle lifetime.

An average (median) particle diameter (D50) of the compound of Formula 1 may be in the range of about 5 nm to about 30 nm, for example, about 10 nm to about 25 nm. The term "D50" used (utilized) herein refers to, if the total volumes of particle diameters are considered to be 100%, a value of the particle diameters at 50% in a cumulative curve that cumulates particle diameters from the smallest particles to the largest particles when measuring the cumulative curve of particle diameter distribution (i.e., D50 refers to where 50% of the population is below/above the value of D50).

When the compound of Formula 1 has an uneven surface or an irregularly-shaped surface, the coating layer may have an excellent binding strength between the compound of Formula 2 and the surface of the compound of Formula 1 on which the compound of Formula 2 is formed.

The coating layer may be a non-continuous coating layer or a continuous coating layer.

The thickness of the coating layer including the compound of Formula 2 may be in a range of about 10 nm to about 500 nm. When a composite positive electrode active material having the thickness within this range is used (utilized), the deterioration of the positive electrode active material may be suppressed upon operation at high voltages.

The compound of Formula 2 is reduced upon receiving lithium ions from the outside. When M1 in the Formulae above is Fe, the compound of Formula 2 may be possibly charged and discharged at a voltage of about 3 V, in comparison to the case when M1 in the Formulae above is Li/Li+. That is, compounds used (utilized) herein are regarded as materials capable of exhibiting their capacities during charge and discharge. When these materials are mixed with the compound of Formula 1 or coated on a surface of the compound of Formula 1, due to a strong covalent bond of CN in the compound of Formula 2, the stability of the compound of Formula 1 may be maintained at high voltages or in a strongly acidic electrolyte. In addition, capacity characteristics of the composite positive electrode active material may be further improved.

The composite positive electrode active material may have a structure in which the coating layer is formed, wherein the coating layer includes the compound of Formula 1 and the compound of Formula 2 formed on the surface of the compound of Formula 1. Here, the compound of Formula 1 may be $LiCoO_2$, $LiNi_{0.4}Co_{0.2}Mn_{0.4}O_2$, $LiNi_{0.5}Co_{0.2}Mn_{0.3}O_2$, $LiNi_{1/3}Co_mMn_{1/3}O_2$, or $LiNi_{0.8}Co_{0.15}Al_{0.05}$, and the compound of Formula 2 may be $Fe_4[Fe(CN)_6]_3 \cdot 3H_2O$ or $Fe_4[Fe(CN)_6]_3$.

In some embodiments, the composite positive electrode active material may be prevented or protected from the deterioration even at a working voltage of 4.5 V or more.

Hereinafter, a method of manufacturing the composite positive electrode active material for a lithium secondary battery, according to an embodiment, will be described in more detail.

First, the compound of Formula 2 may be prepared in the following manner:

$$M^1_z[M^2(CN)_6]_x \cdot nH_2O \quad \text{Formula 2}$$

In Formula 2, $M^1$ and $M^2$ may be each independently at least one selected from the group consisting of Fe, V, Mn, Co, Ni, Cu, and K, z may be in the range of about 2 to about 4, x may be in the range of about 1 to about 5, and n may be in the range of 0 to about 10.

$K_z[M^2(CN)_6]_x \cdot nH_2O$ may be dissolved in a solvent, such as deionized water, to prepare a metal-containing solution.

$K_z[M^2(CN)_6]_x \cdot nH_2O$ may include $K_4[Fe(CN)_6]_3 \cdot 3H_2O$ or $K_3[Fe(CN)_6]_3 \cdot 3H_2O$.

Separately from the preparation of the metal-containing solution, an M2-containing salt may be used (utilized) to prepare an M2-containing salt solution. Here, examples of the M2-containing salt are iron chloride ($FeCl_3$), manganese chloride ($MnCl_2$), cobalt chloride ($CoCl_2$), nickel chloride ($NiCl_2$), copper chloride ($CuCl_2$), and vanadium chloride ($VCl_3$).

The M2-containing salt solution may be added to the metal-containing solution to form a precipitate. The formed precipitate may be filtered and then washed.

The washed resultant may be dried to obtain the compound of Formula 2.

The compound of Formula 1 may be used (utilized) as a core active material that is either mixed with the compound of Formula 2 or coated with the compound of Formula 2.

In the formation of the coating layer by mixing the compound of Formula 2 with the core active material or by coating the compound of Formula 2 on the surface of the core active material, sucrose ($C_{12}H_{22}O_{11}$) may be used (utilized) and significantly improve the binding strength of the compound of Formula 2 with respect to the core active material, in comparison to the case that sucrose is not used (utilized).

The amount of sucrose may be, for example, in a range of about 0.1 to about 1 parts by weight based on 100 parts by weight of the compound of Formula 2. When the amount of sucrose is within this range, the compound of Formula 2 may have an excellent binding strength with respect to the core active material.

An example of the compound of Formula 1 is lithium cobalt oxide. The deterioration may occur more relatively significantly in the lithium cobalt oxide than in other positive electrode active materials upon operation at high voltages. However, when the lithium cobalt oxide is mixed with the compound of Formula 2 or is coated on the surface of the compound of Formula 1, the deterioration in the lithium cobalt oxide may be effectively prevented upon operation at high voltages. In addition, the lithium cobalt oxide may be prevented from a reaction with an electrolyte.

In the case of using (utilizing) a compound in which water content is reduced by removal from the compound of Formula 2 or anhydrous compound of Formula 2 (n=0), the composite positive electrode active material may function as a water scavenger in a battery.

The lithium cobalt oxide may be formed by, for example, a co-precipitation method.

First, cobalt oxide ($Co_3O_4$) and a lithium precursor may be subjected to a heat treatment at a temperature in a range of about 900° C. to about 1,100° C.

Examples of the lithium precursor are lithium hydroxide, lithium fluoride, lithium carbonate, or a mixture thereof. The amount of a lithium compound may be stoichiometrically controlled so as to obtain the lithium cobalt oxide of Formula 1. For example, the amount of the lithium precursor may be in a range of about 1.0 mole to about 1.1 mole based on 1 mole of the cobalt oxide.

The heat treatment may be performed under an oxidizing gas atmosphere. Here, the oxidizing gas atmosphere may include oxidizing gas, such as oxygen or air, and oxidizing gas may include (e.g., consist of) oxygen or air in an amount ranging from about 10 volume % to about 20 volume % and inert gas in an amount ranging from about 80 volume % to about 90 volume %.

The cobalt oxide may be then obtained in the following manner:

First, a cobalt precursor, a precipitant, a chelating agent, and a solvent may be mixed together, and the mixture may be adjusted to have pH in a range of about 9 to about 11. A co-precipitation reaction of the mixture is performed to form a precipitate.

The precipitant may function as a pH adjustor, and examples thereof are a sodium hydroxide solution and ammonium hydroxide.

The chelating agent may have a role of adjusting the reaction rate of the precipitate formation during the co-precipitation reaction, and examples of the chelating agent are sodium hydroxide, ammonium carbonate, sodium oxalate, ammonia, and ammonium sulfate.

The mixture may be subjected to nitrogen purging. Alternatively, the precipitate obtained without carrying out nitrogen purging may be washed, filtered, and then dried, so as to obtain cobalt hydroxide.

The drying of the precipitate may be performed at a temperature in a range of about 60° C. to about 120° C.

The cobalt precursor may be, for example, cobalt sulfate, cobalt nitrate, or cobalt chloride. The amount of the cobalt precursor may be stoichiometrically controlled so as to obtain lithium cobalt oxide of Formula 1.

The solvent may be, for example, water. The amount of the solvent may be in a range of about 100 to about 3,000 parts by weight based on 100 parts by weight of the cobalt precursor. When the amount of the solvent is within this range, a mixture, in which all the components therein are each uniformly mixed with each other, may be obtained.

Hereinafter, a method of manufacturing a lithium secondary battery including the composite positive electrode active material for a lithium secondary battery, according to an embodiment, will be described in more detail, and more particularly, a method of manufacturing a lithium secondary battery including a positive electrode, a negative electrode, a non-aqueous electrolyte containing lithium salt, and a separator, according to an embodiment, will be described in more detail.

The positive electrode and the negative electrode used (utilized) herein may be each manufactured by coating and drying a current collector with a composition for forming a positive electrode active material layer and a composition for forming a negative electrode active material layer.

The composition for forming the positive electrode active material layer may be prepared by mixing a positive electrode active material, a conducting agent, a binder, and a solvent. In this regard, as the positive electrode active material, the composite positive electrode active material according to an embodiment may be used (utilized).

The binder may function as a component assisting a binding between an active material and a conducting agent, or a binding to a current collector, and the amount thereof may be in a range of about 1 to about 50 parts by weight based on 100 parts by weight of the positive electrode active material. Non-limiting examples of the binder are polyvinylidene fluoride, polyvinyl alcohol, carboxymethylcellulose (CMC), starch, hydroxypropyl cellulose, regenerated cellulose, polyvinylpyrrolidone, tetrafluoroethylene, polyethylene, polypropylene, ethylene propylene diene terpolymer (EPDM), sulfonated EPDM, styrene-butadiene rubber, fluororubber, and various copolymers. The amount of the binder may be in a range of about 2 to about 5 parts by weight based on 100 parts by weight of the positive electrode active material. When the amount of the binder is within this range, the active material layer may have a satisfactory binding strength with respect to the current collector.

Any suitable material that is available as the conducting agent in the art may be used (utilized) as long as it has suitable conductivity without causing significant adverse chemical changes in the fabricated battery. Examples of the conducting agent are graphite such as natural graphite or artificial graphite; carbonaceous material such as carbon black, acetylene black, Ketjen black, channel black, furnace black, lamp black, or thermal black; conductive fiber such as carbon fiber or metal fiber; metal powder such as fluorocarbon, aluminum, or nickel powder; conductive whiskey such as zinc oxide or potassium titanate; conductive metal oxide such as titanium oxide; and a conductive agent such as polyphenylene derivate.

The amount of the conducting agent may be in a range of about 2 to about 5 parts by weight based on 100 parts by weight of the total weight of the positive electrode active material. When the amount of the conducting agent is within this range, a finally obtained electrode may have excellent conductivity.

A non-limiting example of the solvent is N-methylpyrrolidone.

The amount of the solvent may be in a range of about 1 to about 10 parts by weight based on 100 parts by weight of the positive electrode active material. When the amount of the solvent is within this range, the active material layer may be easily formed.

A positive electrode current collector may have a thickness in a range of about 3 μm to about 500 μm, and any suitable material that is available as the positive electrode current collector in the art may be used (utilized) as long as it has suitable conductivity without causing significant adverse chemical changes in the fabricated battery. For example, the positive electrode current collector may be formed of stainless steel, aluminum, nickel, titanium, heat-treated carbon, or a material, such as carbon, nickel, titanium, or silver, coated on a surface of aluminum or stainless steel. In addition, the positive electrode current collector may be formed to have an uneven surface at a micro scale so that the positive electrode active material may have great adhesive strength thereto. The positive electrode current collector may be formed into a variety of suitable shapes, such as a film, a sheet, a foil, a net, a porous structure, a blowing agent, or non-woven fabric.

Separately from the preparation of the composition for forming the positive electrode active material layer, a composition for forming the negative electrode active material layer may be prepared by mixing a negative electrode active material, a binder, a conducting agent, and a solvent.

The negative electrode active material may be a material capable of intercalation or deintercalation of lithium ions. Non-limiting examples of the negative electrode active material are graphite; a carbonaceous material such as carbon; a lithium metal or an alloy thereof; and a silicon oxide-based material. The amount of the binder may be in a range of about 1 to about 50 parts by weight based on 100 parts by weight of the total weight of the negative electrode active material. Non-limiting examples of the binder may be the same as those of the binder used (utilized) in the preparation of the positive electrode.

The amount of the conducting agent may be in a range of about 1 to about 5 parts by weight based on 100 parts by weight of the total weight of the negative electrode active material. When the amount of the conducting agent is within this range, a finally obtained electrode may have excellent conductivity.

The amount of the solvent may be in a range of about 1 to about 5 parts by weight based on 100 parts by weight of the total weight of the negative electrode active material. When the amount of the solvent is within this range, the negative electrode active material layer may be easily formed.

The conducting agent and the solvent may be materials that are the same as those used (utilized) in the preparation of the positive electrode.

A negative electrode current collector may have a thickness in a range of about 3 μm to about 500 μm, and any material that is available as the negative electrode current collector in the art may be used (utilized) as long as it has suitable conductivity without causing significant adverse chemical changes in the fabricated battery. For example, the negative electrode current collector may be formed of copper, stainless steel, aluminum, nickel, titanium, heat-treated carbon, a material, such as carbon, nickel, titanium, silver, coated on a surface of copper or stainless steel, or an alloy of aluminum and cadmium. In addition, like the positive electrode current collector, the negative electrode current collector may be formed to have an uneven surface at a micro scale so that the negative active material may have great adhesive strength thereto. The negative electrode current collector may be formed into a variety of suitable shapes, such as a film, a sheet, a foil, a net, a porous structure, a blowing agent, or non-woven fabric.

A separator may be disposed between the positive electrode and the negative electrode prepared as described above.

The separator may have a pore diameter in a range of about 0.01 μm to about 10 μm and a thickness in a range of about 5 μm to about 300 μm. Detailed examples of the separator are an olefin-based polymer such as polypropylene or polyethylene; or a sheet or non-woven fabric formed of glass fabric. When a solid electrolyte, such as a polymer, is used (utilized) as an electrolyte, the solid electrolyte may also function as the separator.

The lithium salt-containing non-aqueous electrolyte may include (e.g., consist of) a non-aqueous electrolytic solution and lithium, and examples of the non-aqueous electrolyte are a non-aqueous electrolytic solution, an organic solid electrolyte, and an inorganic solid electrolyte.

The non-aqueous electric solution may be an aprotic solvent, and non-limiting examples of thereof are N-methyl-2-pyrrolidone, propylene carbonate, ethylene carbonate, butylene carbonate, dimethyl carbonate, diethyl carbonate, gamma-butyrolactone, 1,2-dimethoxyethane, 2-methyltetrahydrofuran, dimethyl sulfoxide, 1,3-dioxolane, N,N-formamide, N,N-dimethyl formamide, dioxolane, acetonitrile, nitromethane, methyl formate, methyl acetate, phosphate triester, trimethoxylmethane, a dioxolane derivative, sulfolane, methyl sulfolane, 1,3-dimethyl-2-imidazolidinone, a propylene carbonate derivative, a tetrahydrofuran derivate, ether, methylpropionic acid, and ethyl propionic acid.

Non-limiting examples of the organic solid electrolyte are a polyethylene derivative, a polyethylene oxide derivative, a polypropylene oxide derivative, a phosphate ester polymer, polyester sulfide, polyvinyl alcohol, and polyvinylidene fluoride.

Non-limiting examples of the inorganic solid electrolyte are Li nitride, such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, halide, and sulfate.

The Li salt may be a material that is easily dissolved in the non-aqueous electrolyte, and non-limiting examples thereof are $LiCl$, $LiBr$, $LiI$, $LiClO_4$, $LiBF_4$, $LIB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenyl borate, and imide.

FIG. 1 is a schematic view of a lithium secondary battery 10 according to an embodiment of the present invention.

Referring to FIG. 1, the lithium secondary battery 10 may include (e.g., mainly consist of) a positive electrode 13, a negative electrode 12, a separator 14 disposed (between the positive electrode 13 and the negative electrode 12), an electrolyte (impregnated in the positive electrode 13, the negative electrode 12, and the separator 14), a battery case 15, and a cap assembly 16 (sealing the battery case 15). The lithium secondary battery 10 may include the positive electrode 13, the negative electrode 12, and the separator 14 that are sequentially stacked, rolled in a spiral form, and accommodated in the battery case 15. Then, battery case 15 may be sealed by the cap assembly 16, thereby completing the manufacture of the lithium secondary battery 10.

Hereinafter, one or more embodiments will be described in more detail with reference to the following examples. However, these examples are not intended to limit the purpose and scope of the invention.

Preparation Example 1: Preparation of Lithium Cobalt Oxide

Cobalt oxide ($Co_3O_4$) and lithium carbonate were adjusted to have lithium and cobalt in a mole ratio of 1:1. Then, they were subjected to dry mixing and a heat treatment at a temperature of about 1,000° C. in oxygen or an air atmosphere for about 10 hours, thereby obtaining lithium cobalt oxide ($LiCoO_2$).

Preparation Example 2: Preparation of Compound of Formula 2 ($Fe_4[Fe(CN)_6]_3 \cdot 3H_2O$)

$K_4Fe(CN)_6 \cdot 3H_2O$ 26.98 g and $FeCl_3 \cdot 6H_2O$ 23.02 g were weighed in a beaker, and were each dissolved in 350 ml of deionized water to obtain $K_4Fe(CN)_6 \cdot 3H_2O$ solution (solution A) and $FeCl_3 \cdot 6H_2O$ solution (solution B).

Solution B was added dropwise to solution A at a supply rate of about 0.7 ml/min for a total of 20 hours. Upon completion of the addition, precipitates were obtained by undergoing a reaction represented by Equation 1 below:

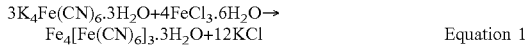

$$3K_4Fe(CN)_6 \cdot 3H_2O + 4FeCl_3 \cdot 6H_2O \rightarrow Fe_4[Fe(CN)_6]_3 \cdot 3H_2O + 12KCl \quad \text{Equation 1}$$

The obtained precipitates were filtered and washed with deionized water twice. The washed resultant was dried in a 120° C. oven for at least 24 hours so as to obtain a compound of Formula 2 ($Fe_4[Fe(CN)_6]_3 \cdot 3H_2O$) (hereinafter, referred to as PBA).

Preparation Example 3: Preparation of Compound of Formula 2 ($Fe_4[Fe(CN)_6]_3$)

PBA ($Fe_4[Fe(CN)_6]_3 \cdot 3H_2O$) of Preparation Example 2 was vacuum-heat treated at a temperature of 60° C. for 24 hours so as to obtain anhydrous PBA $Fe_4[Fe(CN)_6]_3$.

Example 1: Preparation of Composite Positive Electrode Active Material 2.51 g of PBA of Preparation Example 2 was added to 50 ml of anhydrous ethanol, and $ZrO_2$ balls were added thereto in a small amount. The mixture was then ball-milled at a low speed in a range of 20 rpm to 30 rpm. Here, sucrose in an amount of about 1 part by weight based on 100 parts by weight of PBA of Preparation Example 2 was added and ball-milled together. The PBA solution pulverized and dispersed in ethanol was stirred, and 50 g of the lithium cobalt oxide of Preparation Example 1 was added thereto and stirred again. Here, the lithium cobalt oxide of Preparation Example 1 had an average particle diameter in a range of about 10 μm to about 15 μm and had a vertical anisotropic typed particle form.

A solvent of the resultant was evaporated in a hot plate at a temperature of 100° C. to obtain a composite positive electrode active material including lithium cobalt oxide ($LiCoO_2$) coated on the surface thereof with PBA. Here, the amount of PBA in the composite positive electrode active material was about 0.5 mole % based on the total amounts of the positive electrode active material (i.e., a sum of PBA and LCO).

Example 2: Preparation of Composite Positive Electrode Active Material 2.51 g of PBA of Preparation Example 2 and 50 g of the lithium cobalt oxide ($LiCoO_2$) of Preparation Example 1 were mixed together, so as to obtain a composite positive electrode active material including $LiCoO_2$ and PBA. Here, the amount of PBA in the composite positive electrode active material was about 0.5 mole % based on total amounts of the composite positive electrode active material.

Example 3: Preparation of Composite Positive Electrode Active Material

A composite positive electrode active material was obtained in the same manner as in Example 2, except that 4.8 g of PBA was used (utilized) instead of 2.51 g of PBA. Here, the amount of PBA in the composite positive electrode active material was about 1.0 mole % based on the total amounts of the composite positive electrode active material.

Example 4: Preparation of Composite Positive Electrode Active Material

A composite positive electrode active material was obtained in the same manner as in Example 2, except that the amount of PBA of Preparation Example 2 was changed to 4.8 g. Here, the amount of PBA in the composite positive electrode active material of Example 4 was about 1.0 mole % based on the total amounts of the composite positive electrode active material.

Example 5: Preparation of Composite Positive Electrode Active Material

A composite positive electrode active material was obtained in the same manner as in Example 2, except that 2.18 g of anhydrous PBA of Preparation Example 3 was used (utilized) instead of 2.51 g of PBA of Preparation Example 2. Here, the amount of anhydrous PBA in the composite positive electrode active material was of Example 5 about 0.5 mole % based on the total amounts of the composite positive electrode active material.

Example 6: Preparation of Composite Positive Electrode Active Material

A composite positive electrode active material was obtained in the same manner as in Example 4, except that 4.18 g of anhydrous PBA of Preparation Example 3 was used (utilized) instead of 2.18 g of anhydrous PBA of Preparation Example 3. Here, the amount of PBA in the composite positive electrode active material of Example 6 was about 1.0 mole % based on the total amounts of the composite positive electrode active material.

Manufacturing Example 1: Manufacture of Coin Cell

A coin cell was manufactured in the following manner by using (utilizing) the composite positive electrode active material of Example 1:

A mixture of 96 g of the composite positive electrode active material of Example 1, 2 g of polyvinylidene fluoride, 47 g of N-methylpyrrolidone as a solvent, and 2 g of carbon black as a conducting agent was put in a blender to remove bubbles therein, and accordingly, a slurry for forming a positive electrode active material layer in which all the components of the mixture were evenly distributed was prepared.

The slurry was coated on an aluminum thin film by using (utilizing) a doctor blade to form a thin-film plate. The thin-film plate was dried at a temperature of 135° C. for at least 3 hours, and then, roll-pressed and vacuum dried to manufacture a positive electrode.

As a counter electrode to the positive electrode, a lithium metal counter electrode was used (utilized) to manufacture a 2032-type coin cell. A separator (having a thickness of about 16 µm) formed of a porous polyethylene (PE) film was disposed between the positive electrode and the lithium metal counter electrode, and an electrolytic solution was added thereto to form the 2032-type coin cell.

Here, the electrolytic solution was a solution in which 1.1M of $LiPF_6$ was dissolved in a solvent of ethylene carbonate (EC) and ethyl methyl carbonate (EMC) mixed at a volume ratio of 3:5.

Manufacturing Examples 2-6: Manufacture of Coin Cell

Coin cells were manufactured in the same manner as in Manufacturing Example 1, except that the composite positive electrode active materials of Examples 2 to 6 were used (utilized) instead of the composite positive electrode active material of Example 1.

Comparative Manufacturing Example 1: Manufacture of Coin Cell

A coin cell was manufactured in the same manner as in Manufacturing Example 1, except that the lithium cobalt oxide of Preparation Example 1 was used (utilized) instead of the composite positive electrode active material of Example 1.

Comparative Manufacturing Example 2: Manufacture of Coin Cell

A coin cell was manufactured in the same manner as in Manufacturing Example 1, except that PBA of Preparation Example 2 was used (utilized) instead of the composite positive electrode active material of Example 1.

Evaluation Example 1: Scanning Electron Microscopy (SEM)

SEM analysis was carried out on the lithium cobalt oxide of Preparation Example 1 and the composite positive electrode active material of Example 1. The analysis results are shown in FIGS. 2 and 3.

Figure 2:
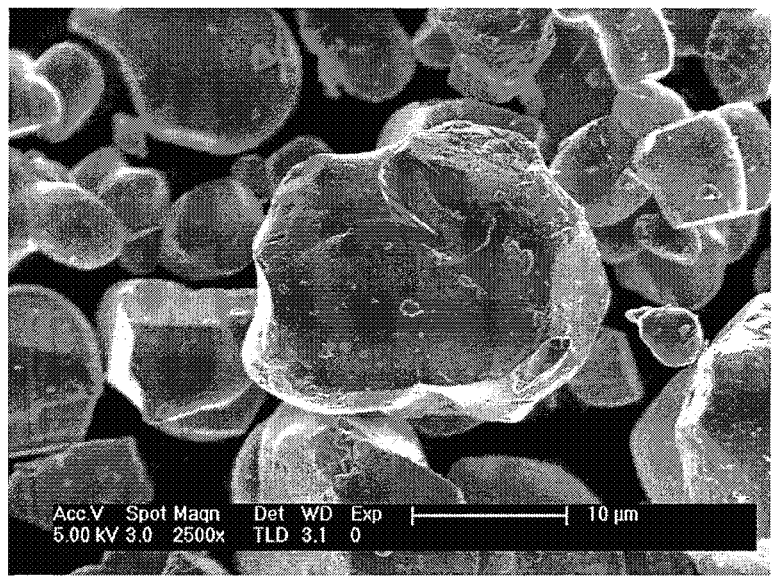
FIG. 2 is a scanning electron microscope (SEM) image of a composite positive electrode active material prepared according to Example 1.
Figure 3:
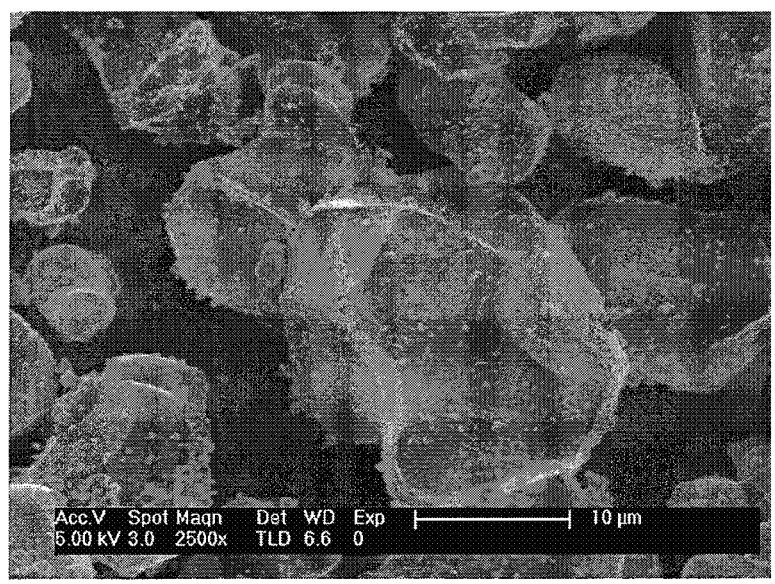
FIG. 3 is an SEM image of lithium cobalt oxide prepared according to Preparation Example 1.

Referring to FIGS. 2 and 3, it was confirmed that the composite positive electrode active material of Example 1 had a structure in which PBA was coated on a surface of the composite positive electrode active material of Example 1.

Evaluation Example 2: Charge/Discharge Test

1) Coin cells of Manufacturing Examples 1 and 3 and Comparative Manufacturing Example 1

The coin cells of Manufacturing Examples 1 and 3 and Comparative Manufacturing Example 1 were charged at a constant current at 0.05 C rate at a temperature of 25° C. until the voltages of the coin cells reached 4.6 V (vs. Li). Then, the coin cells were discharged at a constant current at 0.05 C rate until the voltages of the coin cells reached 2.75 V (vs. Li) (formation step).

The lithium secondary battery formed according to the formation act was charged at a constant current at 0.05 C rate (vs. Li) at a temperature of 25° C. until the voltages of the lithium secondary battery reached 4.6V (vs. Li). Then, the lithium secondary battery was discharged at a constant current at 1.0 C rate until the voltages of the lithium secondary battery reached 2.75 V (vs. Li). The charging and discharging cycle of the lithium secondary battery was repeated 50 times.

Figure 4:
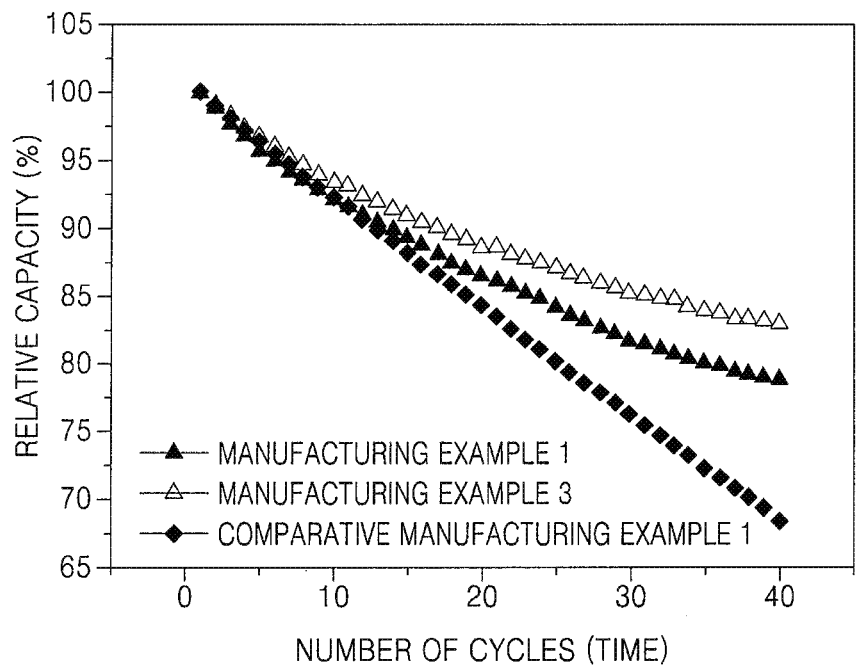
FIG. 4 is a graph showing changes in relative capacities with respect to the number of cycles in coin cells prepared according to Manufacturing Examples 1 and 3 and Comparative Manufacturing Example 1.

The results of charging and discharging tests are shown in FIG. 4.

As shown in FIG. 4, it was confirmed that the coin cells of Manufacturing Examples 1 and 3 had better capacity retention than the coin cell of Comparative Manufacturing Example 1.

2) Coin cells of Manufacturing Examples 2 and 4 and Comparative Manufacturing Example 1

The coin cells of Manufacturing Examples 2 and 4 and Comparative Manufacturing Example 1 were subjected to charge/discharge tests in the same manner as in the coin cell of Manufacturing Examples 1 and 3 and Comparative Manufacturing Example 1. The results are shown in FIG. 5.

Figure 5:
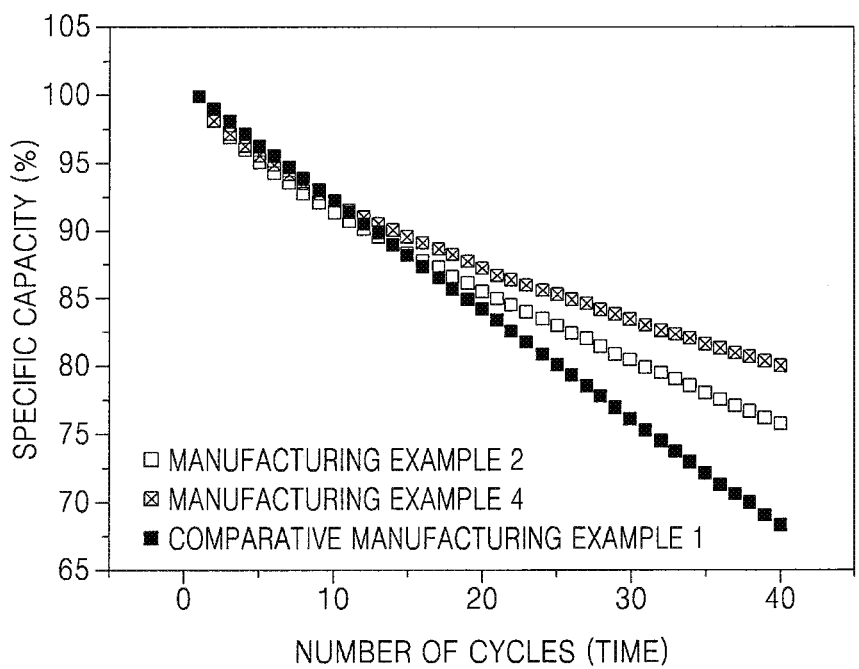
FIG. 5 is a graph showing changes in relative capacities with respect to the number of cycles in coin cells prepared according to Manufacturing Examples 2 and 4 and Comparative Manufacturing Example 1.

Referring to FIG. 5, it was confirmed that the coin cells of Manufacturing Examples 2 and 4 had better capacity retention than the coin cell of Comparative Manufacturing Example 1.

3) Coin cells of Manufacturing Examples 5 and 6 and Comparative Manufacturing Example 1

Figure 6:
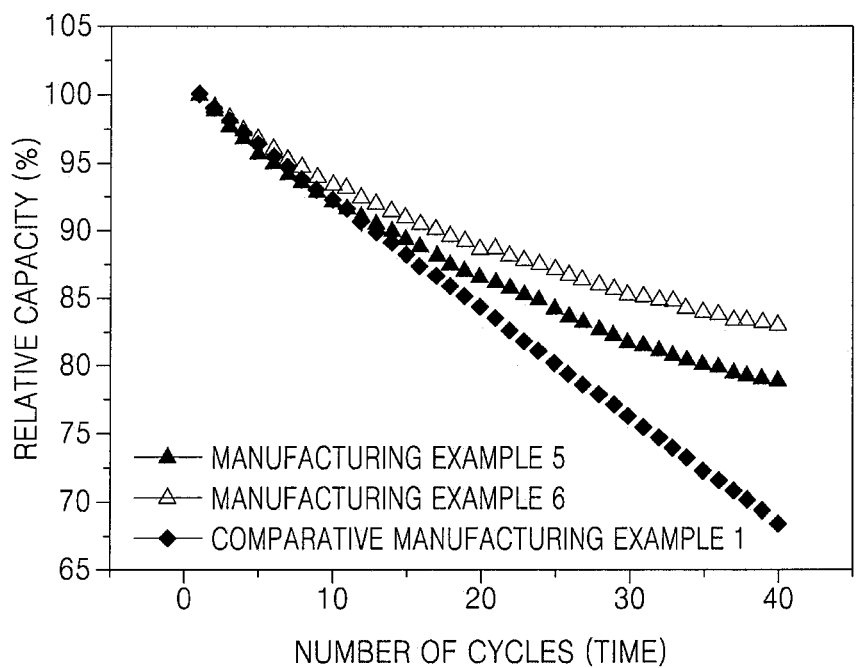
FIG. 6 is a graph showing changes in relative capacities with respect to the number of cycles in coin cells prepared according to Manufacturing Examples 5 and 6 and Comparative Manufacturing Example 1.

The coin cells of Manufacturing Examples 5 and 6 and Comparative Manufacturing Example 1 were subjected to charge/discharge tests in the same manner as in the coin cells of Manufacturing Examples 5 and 6 and Comparative Manufacturing Example 1. The results are shown in FIG. 6.

In manufacturing positive electrodes of the coin cells of Manufacturing Examples 5 and 6, a positive electrode active material using (utilizing) anhydrous PBA, in which water was removed by a heat treatment after the PBA synthesis, was used (utilized). The cycle lifetime of the coin cell using (utilizing) such formed positive electrode active material was found to be further enhanced than the case of using (utilizing) PBA in which water was not removed.

4) Coin cell of Comparative Manufacturing Example 2

Figure 7:
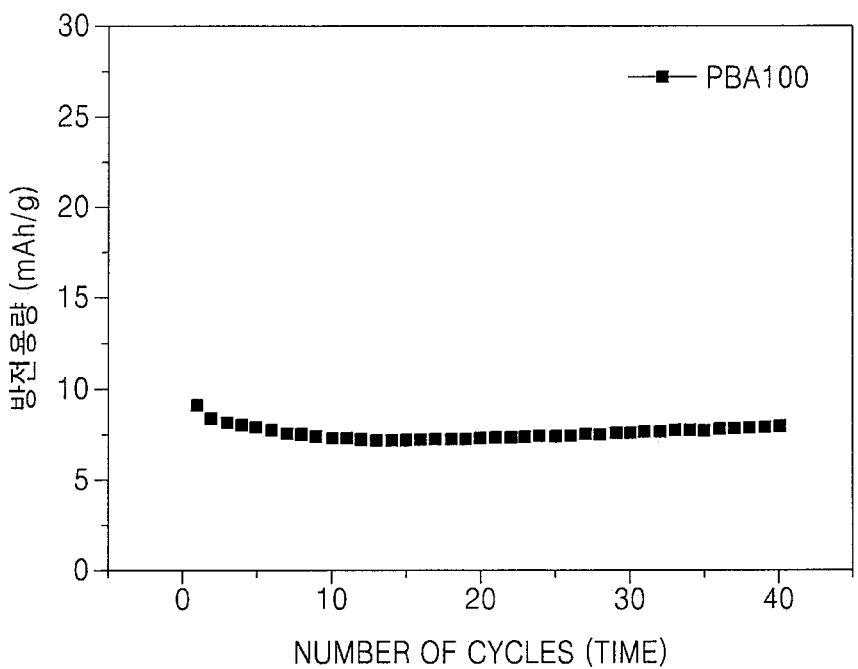
FIG. 7 is a graph showing changes in discharging capacities with respect to repetitive cycles in a coin cell prepared in Comparative Manufacturing Example 2.

The coin cell of Comparative Manufacturing Example 2 was subjected to a charge/discharge test in the same manner as in the coin cells of Manufacturing Examples 1 and 3 and Comparative Manufacturing Example 1. The results are shown in FIG. 7.

The coin cell of Comparative Manufacturing Example 2 used (utilized) PBA as the positive electrode active material. As shown in FIG. 7, it was confirmed that PBA used (utilized) herein had its own capacity with a very low voltage window at voltages in a range of 3 to 4.6 V.

Evaluation Example 3: Analysis Based on Electrochemical Impedance Spectroscopy

The charge transfer resistance of coin cells of Manufacturing Example 5 and 6 and Comparative Manufacturing Example 1 were measured by electrochemical impedance spectroscopy.

Figure 8:
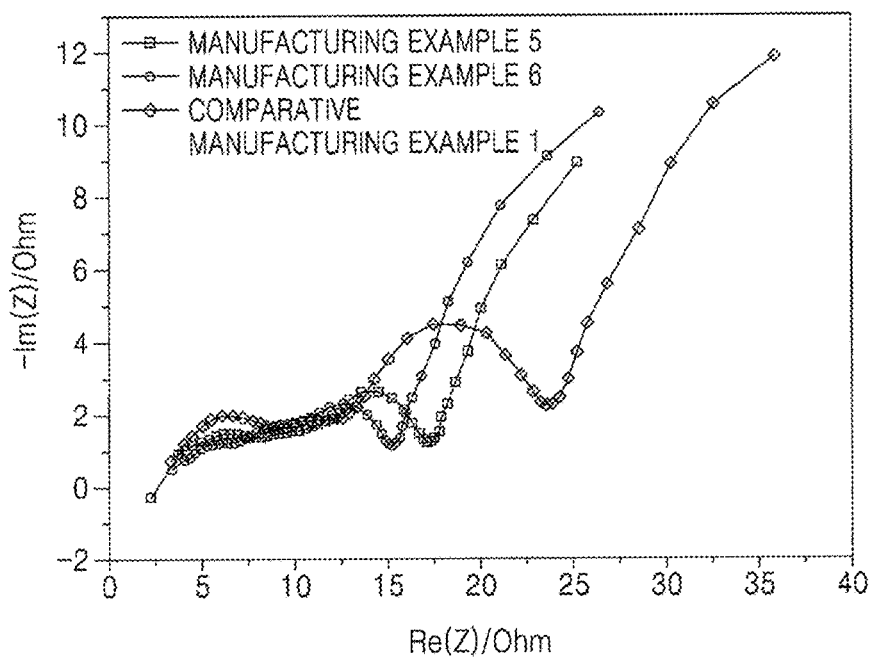
FIG. 8 is a graph showing electrochemical impedance analysis results of coin cells prepared according to Manufacturing Examples 5 and 6 and Comparative Manufacturing Example 1.

The measurement results are shown in FIG. 8.

Referring to FIG. 8, according to the electrochemical impedance spectroscopy analysis results of the coin cells of Manufacturing Examples 5 and 6, the coin cells of Manufacturing Examples 5 and 6 showed a decreased charge transfer resistance based on less charge transfer resistance upon reduction in a side reaction with the electrolytic solution, compared to the case that PBA was coated and the case that PBA was not coated.

As described above, according to the one or more of the above embodiments of the present invention, a lithium secondary battery employs a positive electrode that includes a composite positive electrode active material. In this regard, upon operation at high voltages, the lithium secondary battery that has an extended battery cycle life by preventing deterioration may be manufactured.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A composite positive electrode active material for a lithium secondary battery comprising a compound represented by Formula 1 below and a compound represented by Formula 2 below:

$$Li_aNi_xCo_yMn_zM_{1-x-y-z}O_2 \qquad \text{Formula 1}$$

wherein, in Formula 1, M is selected from boron (B), magnesium (Mg), aluminum (Al), chrome (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W), and a, x, y, and z satisfy the equations of $1.0 \leq a \leq 1.2$, $0.0 \leq x < 1.0$, $0.1 < y \leq 1.0$, $0.0 \leq z \leq 1.0$, and $0.0 \leq 1-x-y-z \leq 0.3$, $$M^1_z[M^2(CN)_6]_x \cdot nH_2O \qquad \text{Formula 2}$$

wherein, in Formula 2, $M^1$ and $M^2$ are each independently at least one selected from iron (Fe), vanadium (V), manganese (Mn), cobalt (Co), nickel (Ni), and copper (Cu), z is in the range of about 2 to about 4, x is in the range of about 1 to about 5, n is 0 or in the range of about 1 to about 10, and the amount of the compound of Formula 2 is in a range of about 0.01 mol % to about 5 mol % based on the total amount of the composite positive electrode active material;

wherein the composite positive electrode active material comprises particles of the compound of Formula 1, each particle being coated only with a non-continuous coating layer consisting of precipitates of the compound of Formula 2.

2. The composite positive electrode active material of claim 1, wherein the thickness of the coating layer is in the range of about 10 nm to about 500 nm.

3. The composite positive electrode active material of claim 1, wherein the compound of Formula 1 is a compound represented by Formula 3 below, a compound represented by Formula 4 below, or a compound represented by Formula 5 below:

$$LiNi_xCo_yMn_zO_2 \qquad \text{Formula 3}$$

wherein, in Formula 3, x, y, and z are each independently in the range of about 0 to about 1 and satisfy the equation of x+y+z=1, $$Li_aCo_yO_2 \qquad \text{Formula 4}$$

wherein, in Formula 4, a is in the range of about 1.0 to about 1.2 and y is in the range of about 0.1 to about 1.0, $$LiNi_xCo_yM_{1-x-y}O_2 \qquad \text{Formula 5}$$

wherein, in Formula 5, x is in the range of 0 to about 0.9 and y is in the range of about 0.1 to about 0.2, and M is selected from B, Mg, Al Cr, V, Ti, Fe, Zr, Zn, Si, Y, Nb, Ga, Sn, Mo, and W.

4. The composite positive electrode active material of claim 1, wherein the compound of Formula 2 is $Fe_z[Fe(CN)_6]_x \cdot nH_2O$, wherein n is 0 or in the range of about 1 to about 3, x is in the range of about 1 to about 5, and z is in the range of about 2 to about 4.

5. The composite positive electrode active material of claim 1, wherein the compound of Formula 2 is $Fe_4[Fe(CN)_6]_3 \cdot nH_2O$, wherein n is 0 or in the range of about 1 to about 3.

6. The composite positive electrode active material of claim 1, wherein the compound of Formula 2 is $Fe_4[Fe(CN)_6]_3 \cdot 3H_2O$ or $Fe_4[Fe(CN)_6]_3$.

7. The composite positive electrode active material of claim 1, wherein the amount of the compound of Formula 2 is in a range of about 0.5 mol % to about 1.0 mol % based on the total amounts of the composite positive electrode active material.

8. The composite positive electrode active material of claim 1, wherein the composite positive electrode active material operates at a voltage of at least about 4.5 V.

9. A lithium secondary battery comprising the composite positive electrode active material of claim 1.

10. The lithium secondary battery of claim 9, wherein the thickness of the coating layer is in the range of about 10 nm to about 500 nm.

11. The lithium secondary battery of claim 9, wherein the compound of Formula 1 is a compound represented by Formula 3 below, a compound represented by Formula 4 below, or a compound represented by Formula 5 below:

$$LiNi_xCo_yMn_zO_2 \qquad \text{Formula 3}$$

wherein, in Formula 3, x, y, and z are each independently in the range of about 0 to about 1 and satisfy the equation of x+y+z=1, $$Li_aCo_yO_2 \qquad \text{Formula 4}$$

wherein, in Formula 4, a is in the range of about 1.0 to about 1.2 and y is in the range of about 0.1 to about 1.0, $$LiNi_xCo_yM_{1-x-y}O_2 \qquad \text{Formula 5}$$

wherein, in Formula 5, x is in the range of 0 to about 0.9 and y is in the range of about 0.1 to about 0.2, and M is selected from B, Mg, Al Cr, V, Ti, Fe, Zr, Zn, Si, Y, Nb, Ga, Sn, Mo, and W.

12. The lithium secondary battery of claim 9, wherein the compound of Formula 2 is $Fe_z[Fe(CN)_6]_x \cdot nH_2O$, wherein n is 0 or in the range of about 1 to about 3, x is in the range of about 1 to about 5, and z is in the range of about 2 to about 4.

13. The lithium secondary battery of claim 9, wherein the compound of Formula 2 is $Fe_4[Fe(CN)_6]_3 \cdot nH_2O$, wherein n is 0 or in the range of about 1 to about 3.

14. The lithium secondary battery of claim 9, wherein the compound of Formula 2 is $Fe_4[Fe(CN)_6]_3 \cdot 3H_2O$ or $Fe_4[Fe(CN)_6]_3$.

15. The lithium secondary battery of claim 9, wherein the amount of the compound of Formula 2 is in a range of about 0.5 mol % to about 1.0 mol % based on the total amounts of the composite positive electrode active material.

16. The lithium secondary battery of claim 9, wherein the composite positive electrode active material operates at a voltage of at least about 4.5 V.

\* \* \* \* \*